United States Patent [19]

Grubisic et al.

[11] Patent Number: 5,026,122
[45] Date of Patent: * Jun. 25, 1991

[54] WHEEL FOR A COMMERCIAL VEHICLE

[76] Inventors: Vatroslav Grubisic, Zumm Stetteritz 1, 6107 Reinheim 4; Gerhard Fischer, Menzelweg 6, 6100 Darmstadt, both of Fed. Rep. of Germany

[ * ] Notice: The portion of the term of this patent subsequent to Jun. 27, 2006 has been disclaimed.

[21] Appl. No.: 837,885

[22] Filed: Mar. 10, 1986

Related U.S. Application Data

[63] Continuation of Ser. No. 445,253, Nov. 29, 1982, Pat. No. 4,842,338.

[30] Foreign Application Priority Data

Dec. 3, 1981 [DE] Fed. Rep. of Germany ....... 3147820

[51] Int. Cl.$^5$ ................................................ B60B 3/00
[52] U.S. Cl. ............................. 301/9 DN; 301/37 S; 301/63 R
[58] Field of Search .......... 411/531; 301/9 DN, 37 R, 301/37 S, 63 C, 63 PW, 63 R

[56] References Cited

U.S. PATENT DOCUMENTS

| | | | |
|---|---|---|---|
| 2,432,530 | 12/1947 | Lyon | 301/37 S |
| 2,439,881 | 4/1948 | Ash | 301/65 |
| 3,166,357 | 1/1965 | Vachon et al. | 310/9 DN |

FOREIGN PATENT DOCUMENTS

| | | | |
|---|---|---|---|
| 1272053 | 7/1968 | Fed. Rep. of Germany | 301/9 DN |
| 2308925 | 9/1973 | Fed. Rep. of Germany | 301/9 DN |
| 55-91401 | 7/1980 | Japan | 301/65 |
| 2102744 | 2/1983 | United Kingdom | 301/63 PW |

OTHER PUBLICATIONS

International Bulletin No. SM-4, 1969.

*Primary Examiner*—Russell D. Stormer
*Attorney, Agent, or Firm*—Horst M. Kasper

[57] ABSTRACT

A wheel is provided for a commercial vehicle which comprises a wheel disk having bolt holes in the region of the wheel mounting face for attaching the wheel disc to a wheel hub flange or to a brake drum by way of wheel bolts and intermediate disks surrounding the bolt holes directly and concentrically and which by themselves provide a support surface between wheel mounting face wheel hub flange or, respectively, brake drum or dual wheel. The intermediate disks allow to avoid fretting corrosion in the support region of the wheel disc, stiffening of the wheel disk central region, avoiding of surface damage, and improvement of the bolting. The intermediate disks can be solidly attached to the wheel disk by way of adhesive disposed in between, by friction setting, or by casting.

20 Claims, 2 Drawing Sheets

WHEEL FOR A COMMERCIAL VEHICLE

CROSS REFERENCE TO RELATED APPLICATIONS

This application is a continuation application of another application filed Nov. 29, 1982 and bearing Ser. No. 445,253, now U.S. Pat. No. 4,842,338. The entire disclosure of this latter application, including the drawings thereof, is hereby incorporated in this application as if fully set forth herein.

BACKGROUND OF THE INVENTION

1. Field of the Invention

The present invention relates to a wheel disk of a commercial vehicle wheels having bolt holes in the region of the wheel mounting face for receiving wheel bolts, which serve to attach the wheel to a wheel hub flange or to a brake drum.

2. Brief Description of the Background of the Invention Including Prior Art

The minimum wall thickness of the wheel disc in the contact area of the mounting face of wheel to flange is determined in the context of commercial vehicles, in particular of those with light alloy or light metal wheels, by the fretting corrosion occurring there, which causes a considerable decrease of the fatigue strength. If it would be possible to avoid fretting corrosion, then the wall thickness could be decreased considerably and thereby material requirements and weight could be lowered. This is of particular importance for light alloy or light metal wheels which require, in comparison with steel wheels nearly twice the wall thickness in the area of the wheel mounting face. A special bolting is required based on this situation in many types of trucks, in particular in the case of dual wheels, and further a change of the track dimensions is effected.

Vachon et al. in U.S. Pat. No. 3,166,357 teach procedures relating to custom wheel installation. The reference teaches a wheel member with a hub suitable for universal use with a great variety of makes of automobiles. The reference teaches that the alignment plate is of substantial construction so that there is no sacrifice of structural strength by virtue of the perforation of the hub or with the utilization of thinner material for such hub than is utilized in earlier devices. It appears to be appropriate to conclude that such a reinforcement ring would have a thickness about equivalent to that of a wheel and it is quite clear that the sum of the thicknesses of the wheel and of the Vachon et al. plate is much more than that of a regular wheel.

SUMMARY OF THE INVENTION

1. Purposes of the Invention

It is an object of the present invention to avoid or diminish the influence of fretting corrosion in the region of the bolting by simple means, which in particular do not require additional operational steps in the production of the wheels to improve the fatigue behavior of contact surface.

It is another object of the present invention to provide for stiffening of the wheel disk center section and to improve the behavior of the wheels bolting to the support structure.

It is a further object of the present invention to provide a method for attaching a wheel to a commercial vehicle by way of bolts and bolt holes and to avoid frictional corrosion.

These and other objects and advantages of the present invention will become evident from the description which follows.

2. Brief Description of the Invention

The present invention provides a wheel for a commercial vehicle which comprises a wheel disk having bolt holes in the region of the wheel mounting face for attaching the wheel to a wheel hub flange or to a brake drum by way of wheel bolts, and intermediate disks surrounding the bolt holes directly and concentrically and which by themselves provide a support surface between wheel support means and wheel mounting face. The wheel support means can be provided by a wheel hub flange, by a brake drum, or by dual wheels. The intermediate disks can be attached adhesively, by way of a friction setting or can be cast into the wheel. The intermediate disks can be provided for each bolt in the support region of the wheel bolt heads or by an annular disk around the hub of the wheel in the support region of the wheel bolt nuts.

There is also provided a method for attaching a wheel to a commercial vehicle by way of bolts passing through bolt holes which comprises attaching intermediate disks to the wheel disk for surrounding the bolt holes directly and concentrically and which intermediate disks by themselves provide a support surface between wheel mounting face wheel hub flange or, respectively, brake drum or dual wheels, and bolting the wheel to a support structure disposed on the commercial vehicle.

There is also provided a method for avoiding and/or decreasing fretting corrosion between the wheel of a commercial vehicle and its support structure which comprises disposing an intermediate disk between the wheel disk and the support structure and then bolting the wheel to the support structure.

Thus the intermediate disks are solidly connected to the wheel disk and surround the bolt holes immediately and concentrically or via the circumference of the wheel mounting face and which intermediate disks by themselves form the support surface between the wheel mounting face and the wheel hub flange or, respectively, the brake drum. The intermediate disks can be connected to the wheel disk in a simple fashion such as by way of gluing, friction setting or by casting into the wheel. It is particularly advantageous to employ like intermediate disks also in the contact area of the wheel bolt heads or of the wheel bolt nuts.

Upon employing of the intermediate disks applied to the two sides at the wheel mounting faces in the circumferential direction, an additional stiffening effect of the relatively low strength base material of light alloy or light metal wheel is observed in addition to the avoidance of fretting corrosion, if the intermediate disks comprise a higher strength material such as for example steel. According to the composite construction, in particular at the wheel central region, which is highly stressed with respect to bending, part of the flow of force is fed from the intermediate disks disposed at the outside and held together by wheel bolts or respectively adhesive connections, such that an unloading of the lower strength basic material is present.

In addition, the material indentation and surface damage under the wheel nuts caused by the high contact pressure is completely avoided with the aid of intermediate disks disposed at the light alloy or light metal wheel, which material indentation and surface damage can result during operation in a loss of the bolting force or in a fracture of the wheel or of the wheel bolts. Upon use of adhesively attached intermediate disks a more advantageous spring effect can be achieved additionally, which renders the bolt connection less sensitive to a loss of the bolting force torque.

The wall thickness in the bolting region of light alloy or metal wheels for trucks can be decreased clearly based on the advantageous effects of the intermediate disk which include Avoiding of Fretting Corrosion Stiffening of the Wheel Mounting Face based on Composite Construction Avoidance of Material Indentations under the Wheel Bolts in the Base Material Associated with Loss of the Bolting Force Improvement of the Nut Torque Behavior of the Bolts.

This results not only in the advantage of saving materials and excess weight, but also in a better structural and material quality (less inclusions, less blowholes and the like) due to lower thickness in this area.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
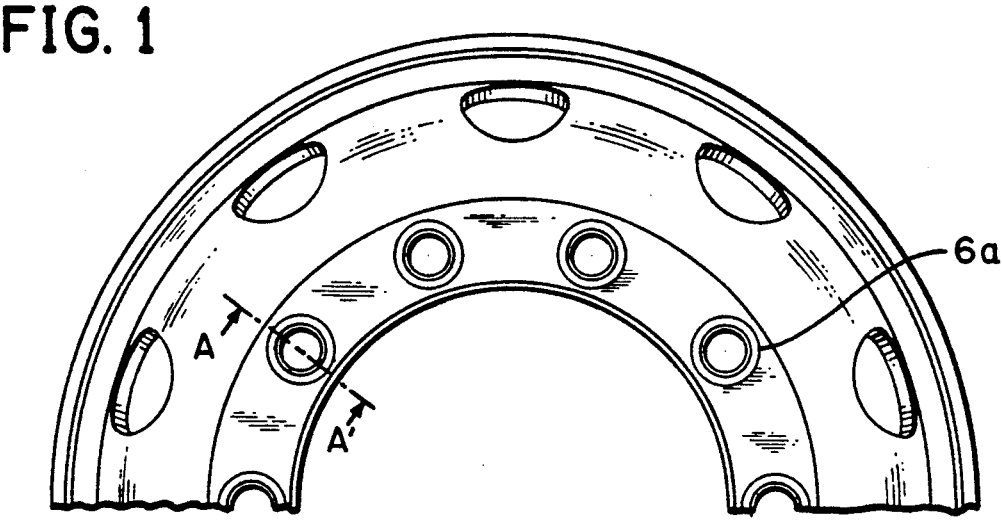
FIG. 1 is a schematic view of a wheel with concentric intermediate disks.

In accordance with the present invention there is provided a wheel disk of a commercial vehicle with bolt holes in the wheel central region, which serve for receiving the wheel disk at a wheel hub flange or a a brake drum by way of wheel bolts. Intermediate disks 5 are solidly connected to the wheel disk 1 and surround the bolt holes 4 immediately, concentrically 6a or in circumferential direction 6b. The intermediate disks alone form a support surface between wheel mounting face 2, wheel hub flange or, respectively, brake drum 3 or dual wheels.

The intermediate disks can be adhesively attached to the wheel disk, they can be friction set into the wheel, or they can be cast into the wheel. Like intermediate disks 6, 6a, 6b can be provided in the support region of the wheel bolt heads or of the wheel bolt nuts 7.

Figure 3:
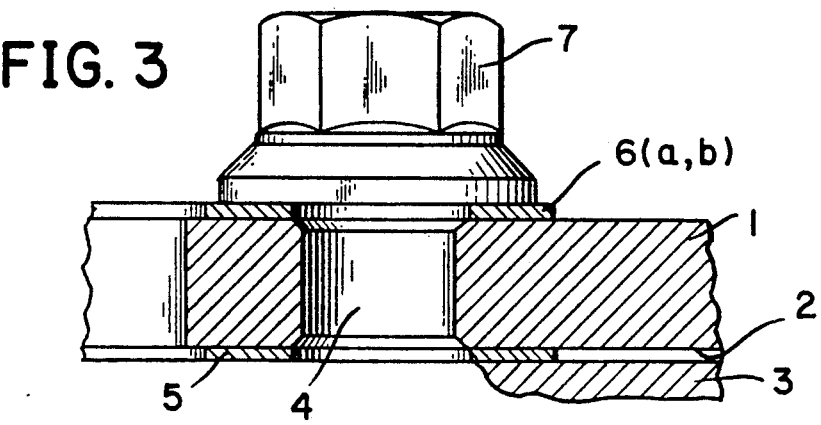
FIG. 3 is an in part sectional view of FIG. 1 along section line A-A'.
Figure 6:
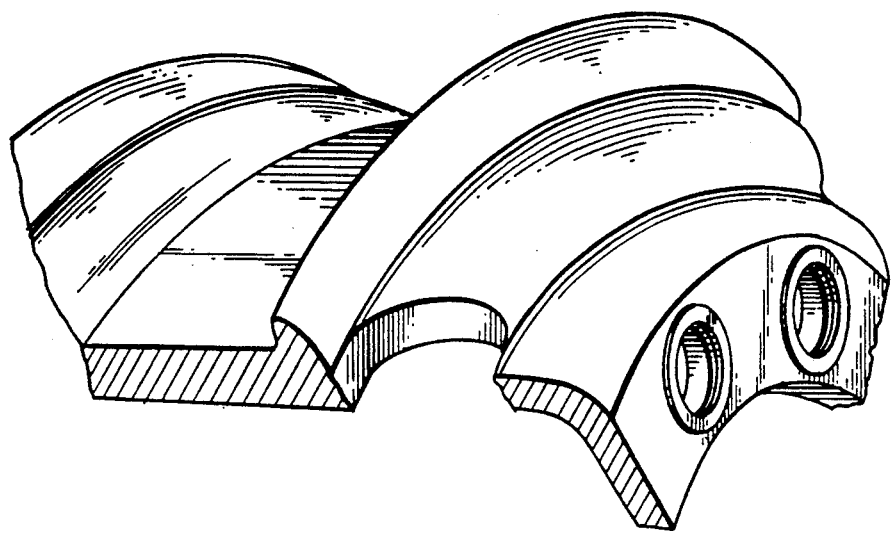
FIG. 6 is a perspective view of an applied reinforcement disk.

Referring now to FIG. 3 there is shown as a section a part of a wheel disc 1 with wheel mounting face 2 and with a bolt hole 4. A corresponding part of a wheel hub flange or, respectively, of a brake drum is indicated at 3, to which the wheel disc is to be attached by way of a wheel bolt indicated through a wheel nut 7.

Figure 2:
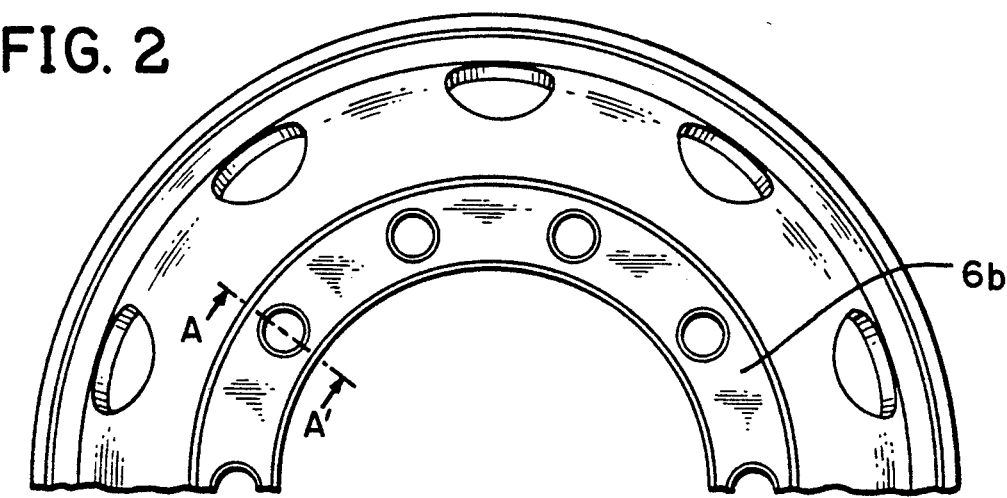
FIG. 2 is a schematic view of a wheel with intermediate disks at the circumference of the wheel mounting face.

An intermediate disk 5 solidly connected to the wheel disc 1 is provided in the support region of the wheel mounting face 2 and the intermediate disk 5 surrounds the bolt hole 4 directly concentric 6a as shown in FIG. 1 or via the circumference of the wheel mirror 6b as shown in FIG. 2. The complete sum of such intermediate disks 5 surrounding the bolt holes forms the sole support surface between the wheel mounting face 2, the wheel hub flange or, respectively, the brake drum 3 or the dual wheels.

The appearance of fretting corrosion is suppressed in the support region of the wheel nut 7 or of a corresponding wheel bolt because of the presence of a disk 6 disposed like the intermediate disk 5 and also solidly connected to the wheel disk 1.

Figure 4:
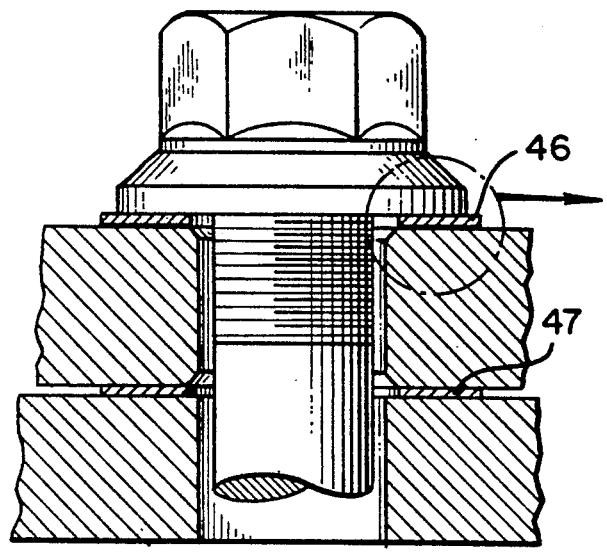
FIG. 4 is an in part sectional view through the bolt connection of a wheel.

Referring now to FIG. 4, there is shown a view similar to that of FIG. 3. The area of the reinforcement disk is designated as 46 and 47, respectively.

Figure 5:
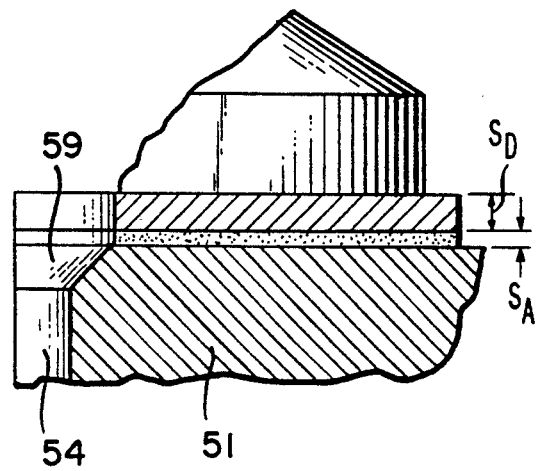
FIG. 5 is a more detailed schematic sectional view of the area about a reinforcement disk.

FIG. 5 is a detailed view of the section of FIG. 4, where the reinforcement disk is attached. An aluminum wheel 51 is employed. A bore hole 54 can have a bevel 59 or can be cylindrical. Immediately adjacent to the bore hole and preferably joining an outer edge of the bevel there is disposed next to the wheel a layer of adhesive. The thickness of the adhesive layer can be from $S_A = 0.01$–$0.2$ of the thickness of the wheel disk depending on the applied adhesive. The thickness of the reinforcing disk $S_D$ can be from about 0.02 to 0.1 of the thickness of the aluminum wheel and is preferably from about 0.04 to 0.06 of the thickness of the aluminum wheel. The wheel is preferably made from cast or forged light metal alloys (aluminum or magnesium alloys). The reinforcement disk is preferably made from rolled steel sheet. The production method of the attachment of the wheel provides that the strength of attachment of the reinforcement steel disk is at least 10 $N/mm^2$. The adhesion layer exhibits a certain elasticity with maximum elongation from about 2 percent to 15 percent depending on the required heat resistance.

The present invention provides a primary effect of suppression of fretting corrosion which is a substantial factor in the strength and stability of such wheels, where a wheel is fabricated from a relatively soft aluminum alloy having attached the reinforcement disk. This is provided in accordance with the invention by binding together the reinforcement disk with the base material such that no local relatively strong motion between the relatively sensitive base material and the steel parts is generated, where these parts include for example screws or bolts for the attachment of the wheels as well as hubs and the brake drum. The insertion of a disk as taught in the art for example in the Vachon et al. reference does not achieve this effect.

The binding of the relatively thin disks along their full extension on the two sides of the wheel disk effects a supporting in steps or a distribution of the load over a larger better supported surface and thus a lowering of the stresses on the base material of the wheel disk in the critical area of the placement of the bolts. This effects an increased fatigue strength in the area of the wheel mounting face. This is achieved by adhesive attachment and the kind of glue employed is not decisive. The adhesive is preferably a moisture resistant adhesive, which can withstand temperatures in a range of from about −20 degrees centigrade to about 150 degrees centigrade. The adhesives are available from various manufacturers. Similar effects can be achieved with a cast-in plate.

According to a preferred embodiment, a disk as thin as possible and made from steel is bonded to the surface of the wheel disk base material such that it deforms with the base material and prevents fretting corrosion. The steel disk can have a thickness of from about 0.5 to 2 millimeters and preferably from about 0.5 to 1.5 millimeters. These dimensions are in consideration of wall thicknesses of from about $S_W = 15$ to 25 millimeters as employed for commercial vehicles.

Wheel disks can experience fatigue cracks because of high stress around the bolts and because of relative movement between nuts and wheel disk on the outside of the wheel and between the hub or brake drum flange and wheel disk on the inner side. This can influence the fatigue strength in the these areas of a conventional wheel which will be up to 50 percent lower than in other areas of the wheel. Where an adhesive layer is employed between wheel and a reinforcing disk according to the invention, there the elastic movement is balanced by the adhesive layer such that no damage occurs to the wheel surface because of the relative abrasive motion between two metallic surfaces placed under a strong surface area pressure. In addition, the hard reinforcement disk prevents a deformation of an aluminum wheel based on a pressing in of a nut, where during operation a decrease of the nut torque is avoided which guarantees a good wheel attachment.

For example, testing a truck wheel of the size $7.5 \times 22.5$, as recommended in SAEJ 267, under dynamic cornering fatigue tests, a wall thickness of 25 mm will be necessary to achieve $2 \times 10^6$ cycles to failure under a test bending moment of 30 kNm. The same life will be achieved under this bending moment with a wall thickness of 20 mm if reinforcements discs are used. The reduced wall thickness will save not only on the aluminum material and the weight but also on the length of the necessary bolts to attach the wheel on its support.

While the invention has been illustrated and described in the context of a wheel for a commercial vehicle employing reinforcement disks for attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wheel for a commercial vehicle comprising
   a wheel disk having bolt holes in the region of the wheel mounting face for attaching the wheel disk to wheel support means by way of wheel bolts; and
   intermediate disks for covering an area of the bolt holes in the wheel for attachment bolts, which intermediate disks are attached to the wheel disk on the two opposite sides of the wheel disk, which intermediate disks have a hole for each bolt with the hole surrounding the bolt holes directly and concentrically, which intermediate disks have a thickness of less than about 0.1 of the thickness of the wheel disk and which intermediate disks disposed between wheel and support means provide a support surface between support means and wheel mounting face.

2. The wheel for a commercial vehicle according to claim 1 wherein the wheel support means is provided by a wheel hub flange.

3. The wheel for a commercial vehicle according to claim 1 wherein the wheel support means is provided by a brake drum.

4. The wheel for a commercial vehicle according to claim 1 wherein the wheel support means is provided by a dual wheel.

5. The wheel for a commercial vehicle according to claim 1 wherein the intermediate disks are adhesively attached to the wheel disk.

6. The wheel for a commercial vehicle according to claim 1 wherein the intermediate disks are friction set into the wheel disk.

7. The wheel for a commercial vehicle according to claim 1 wherein the intermediate disks are cast into the wheel disk.

8. The wheel for a commercial vehicle according to claim 1 wherein uniform intermediate disks are provided for each bolt in the support region of the wheel bolt heads.

9. The wheel for a commercial vehicle according to claim 1 wherein the wheel support means is provided by a brake drum, wherein the intermediate disks are adhesively attached to the wheel disc, and wherein uniform intermediate disks are provided for each bolt in the support region of the wheel bolt heads.

10. A method for attaching a wheel to a commercial vehicle by way of bolts and bolt holes comprising attaching intermediate disks for covering an areas of the holes of a wheel disk for attachment bolts to the wheel disk on two opposite sides of the wheel disk, and the intermediate disks having a hole for each bolt for surrounding the bolt directly and concentrically, which intermediate disks have a thickness of less than about 0.1 of the thickness of the wheel disk and which intermediate disks by themselves provide a support surface between wheel mounting face, wheel hub flange or, respectively, brake drum or dual wheels, and
   bolting the wheel to a support structure disposed on the commercial vehicle.

11. The method for attaching a wheel to a commercial vehicle according to claim 10 wherein the intermediate disks are adhesively attached to the wheel disk.

12. The method for attaching a wheel to a commercial vehicle according to claim 10 wherein the intermediate disks are friction set into the wheel disk.

13. The method for attaching a wheel to a commercial vehicle according to claim 10 wherein the intermediate disks are cast into the wheel disk.

14. A method for avoiding fretting corrosion between the wheel of a commercial vehicle and its support structure comprising
   attaching an intermediate disk at a wheel disk on the side corresponding to heads of bolts for covering an area of bolt holes in the wheel disk and the intermediate disks having a hole for each bolt, which intermediate disks have a thickness of less than about 0.1 of the thickness of the wheel disk;

attaching an intermediate disk at the wheel disk on the side of the support structure for covering the area of the bolt holes in the wheel disk and the intermediate disks having a hole for each bolt; and bolting the wheel to the support structure.

15. The method for avoiding fretting corrosion according to claim 14 wherein the intermediate disk is adhesively attached to the wheel.

16. The method for avoiding fretting corrosion according to claim 14 wherein the intermediate disks are friction set into the wheel disk.

17. The method for avoiding fretting corrosion according to claim 14 wherein the intermediate disks are cast into the wheel disk.

18. The method for avoiding fretting corrosion according to claim 14 wherein the structural support is provided by a wheel hub flange.

19. The method for avoiding fretting corrosion according to claim 14 wherein the structural support is provided by a brake drum.

20. The method for avoiding fretting corrosion according to claim 14 wherein the structural support is provided by a dual wheel.

* * * * *